June 16, 1936.  C. H. LANK  2,044,477
WATER GAUGE
Filed July 28, 1932  2 Sheets-Sheet 2
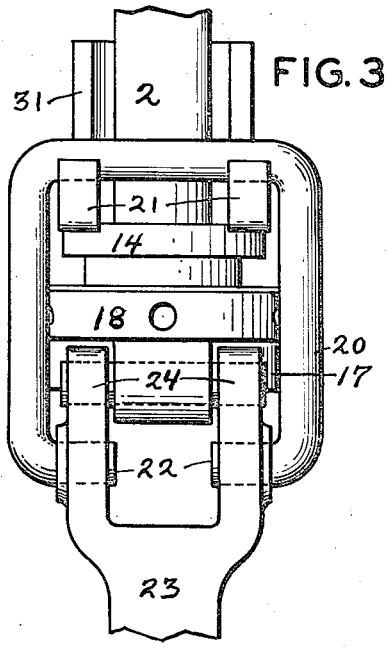
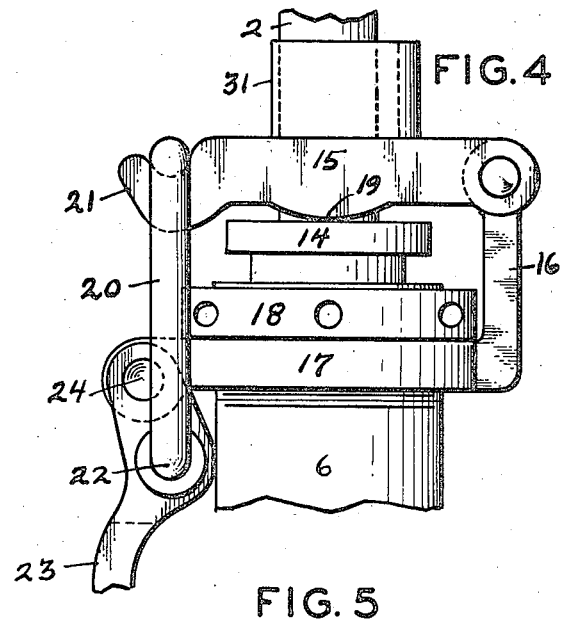
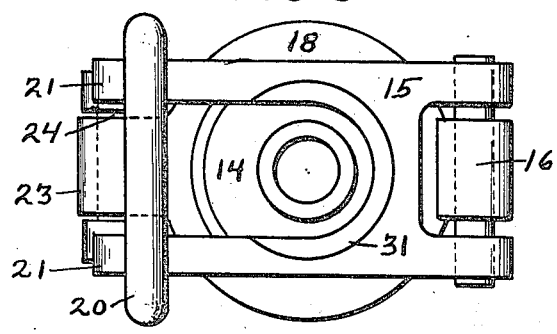
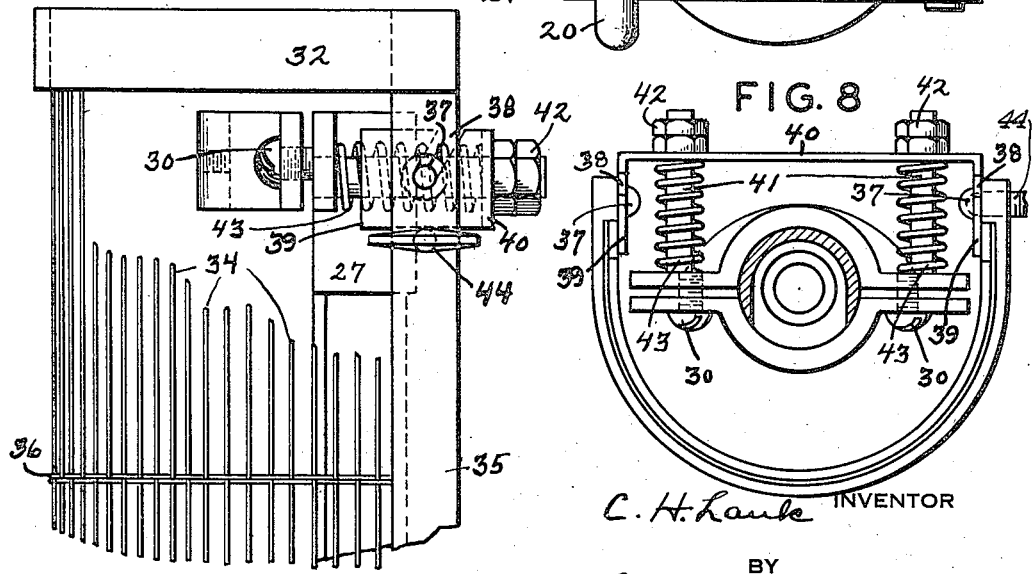
C. H. Lank INVENTOR
BY Thomas Howe ATTORNEY Patented June 16, 1936

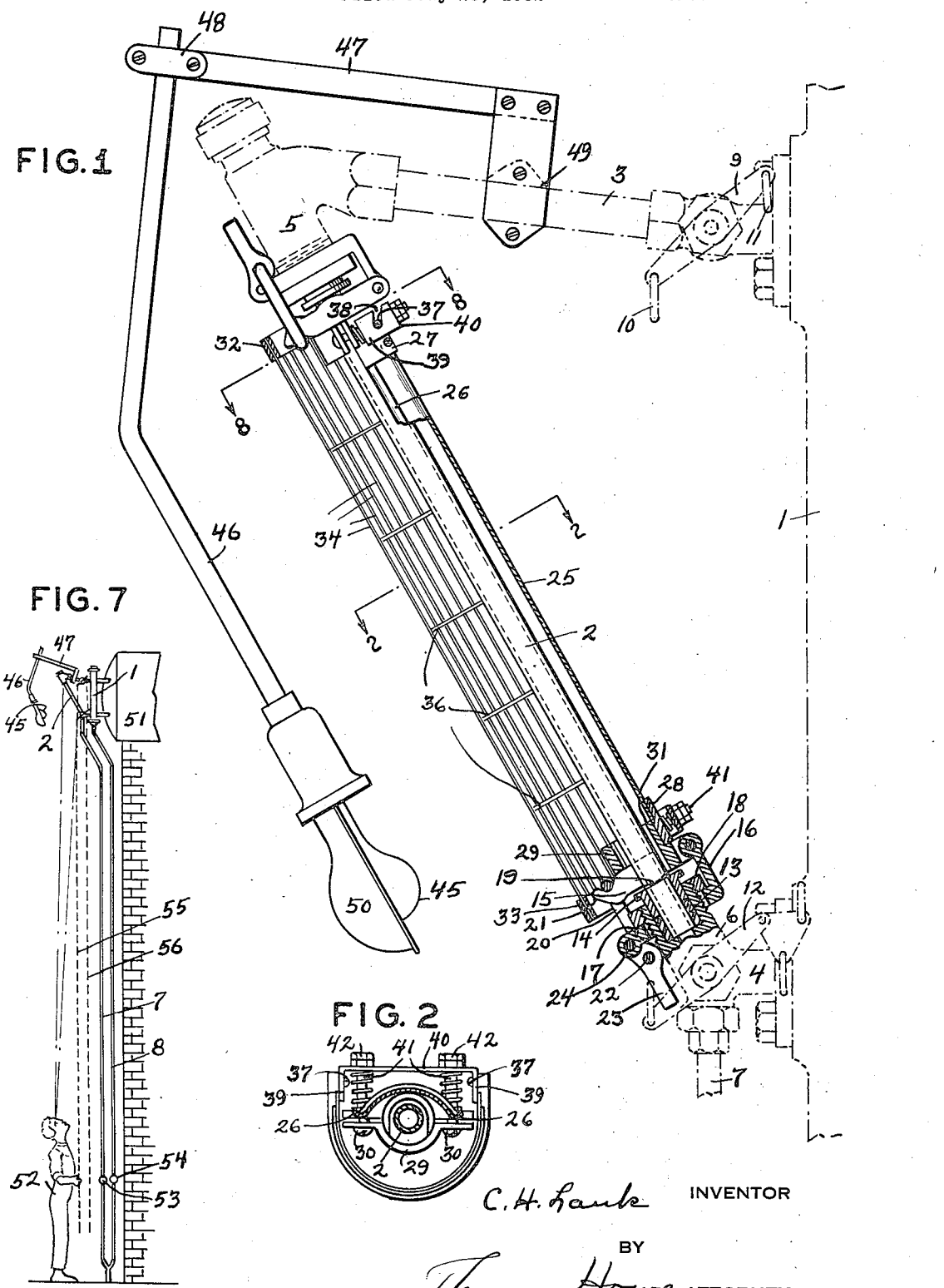

2,044,477

UNITED STATES PATENT OFFICE 2,044,477

WATER GAUGE

Clarence H. Lank, Brooklyn, N. Y.

Application July 28, 1932, Serial No. 625,234

2 Claims. (Cl. 73—54)

This invention relates to water gauges for use in indicating the level of the water in steam boilers and the like.

The main object of this invention is to provide an apparatus of the character described which shall be free to the greatest extent from dangers of explosion of the gauge, and which shall be accurately and readily readable, and which shall be simple in construction and readily adjustable.

More specifically, the objects of the invention may be set forth as follows:

It is one object of the invention to provide an improved guard for a gauge.

It is another object of the invention to provide an improved mounting for the guard.

It is another object of the invention to provide an improved securing means for the gauge glass.

It is another object of the invention to properly correlate the gauge glass and the guard.

It is another object of the invention to provide an improved correlation of illuminating source, a reflector and the gauge glass whereby the reading of the gauge glass indication is facilitated.

Other and ancillary objects will appear hereinafter.

In the accompanying drawings which illustrate the invention,

Fig. 1 is a side elevation, partly in section, of a gauge and fittings embodying the invention;

Fig. 2 is a section on the line 2—2 of Fig. 1;

Fig. 3 is an enlarged front elevation, partly broken away, of the securing means for one end of the gauge glass;

Fig. 4 is a side elevation of the apparatus of Fig. 3;

Fig. 5 is a top plan view of the apparatus of Fig. 3;

Fig. 6 is an enlarged view in side elevation of the upper end of the gauge, certain of the parts being omitted, showing the securing means for the guard and reflector;

Fig. 7 is a side elevation of a boiler, partly broken away, and showing my improved gauge mounted thereon and the position of an attendant which is most frequently occupied when observing the gauge; and Fig. 8 is a section, on an enlarged scale, on the line 8—8 of Fig. 1.

Referring to the drawings, the gauge is secured to and communicates with the interior of a vertical water column 1 mounted upon and communicating with the steam drum of a steam boiler in the usual way. The gauge glass 2 is supported by, and has its ends in communication with, the water column by means of the upper and lower tubular fittings 3 and 4. The upper fitting has the acute angled branch 5 while the lower fitting 4 has the obtuse angled branch 6. The branches 5 and 6 are each adapted to receive one end of the gauge glass and are axially in line with each other and with the glass. The lower fitting is connected with a water blow down pipe 7 and another blow down pipe 8 is connected with the water column 1. Also communication with the upper end of the gauge glass is controlled by an operating arm 9 fixed on a stem of a valve in the fitting 3 and turned to open or close the valve by means of chains 10 or 11. Similarly, a valve in the lower fitting is provided with a valve controlling communication with the lower end of the gauge glass, an arm 12 being fixed upon the stem of the valve and adapted to be operated by chains pulling the ends of the arm respectively.

The ends of the gauge glass are entered within sockets in each of the fitting branches 5 and 6 in a well-known manner and are rendered tight therein by the same means at each end which will therefore be described in connection with the lower end only. The lower end of the gauge glass 2 is entered within a socket in the fitting branch 6, and within the socket and surrounding the tube is a suitable packing 13 adapted to be compressed by the gland 14 sliding within the socket.

The gland is adapted to be pressed downwardly against the packing by means of a bifurcated member 15 having its legs passing on opposite sides of the gauge glass, and hinged in the upwardly turned arm 16 extending from the collar 17 loosely surrounding the fitting branch 6 and limited in its upward movement by a collar 18 in screw-threaded engagement with the branch 6. Each of the legs of the bifurcated member 15 has, upon its lower side, a rounded projection 19 adapted to bear against the gland 14. These rounded projections give a substantially one-point contact upon the gland upon each side of the gauge glass and thereby permit the adjustment of the parts to each other, whereby a force substantially longitudinal of the gauge glass and without lateral component is exerted upon the gland. In this way torsional strains liable to be produced by the usual rotational gland tightening nut are avoided.

To force the gland against the packing and lock it into secured position, a link 20 engages its bight with the hooked ends 21 of the legs of the bifurcated member 15, the link having its ends 22 pivoted in the lever 23 hinged to the collar 17 at 24.

To compress the packing, the gland having been placed into position thereon, the bifurcated member 15 is turned downwardly about its hinge until it bears against the gland. The lever 23 being thrown outwardly and upwardly, the link 20 is engaged with the hooks 21. The lever is then turned downwardly about its hinge 24 into the position as shown in Figs. 1 and 4, and the projection 19 will force the gland downwardly and compress the packing. In the final position of the lever the ends 22 of the link will be carried past the center 24 so that a locked toggle is formed securing the bifurcated member in a compressing position. The compression may be regulated by raising or lowering the collar 18 by turning it upon its screw-threads. Obviously, the pressure can be released and the bifurcated member thrown to one side out of the way for effecting necessary adjustment or replacement of parts, by throwing the lever 23 outwardly and upwardly and releasing the link 20 from the bifurcated member.

Mounted back of the gauge glass is an arc shaped reflector 25 which may be of a thin piece or sheet of metal having its concave side polished so as to act as a reflector. The edges 26 of the reflector are bent over so as to form a longitudinal strengthening and stiffening rib or bead. The radius of curvature of the reflector 25 is greater than that of the gauge glass 2 and the reflector is placed in such proximity to the gauge glass that its centre of curvature is on the opposite side of the gauge glass centre from the reflector. In other words, the distance of the reflector from the gauge glass centre is less than the radius of curvature of the reflector. Also the plane through the edges of the reflector is not forward of the axis of the gauge glass. In other words, the reflector does not embrace more than one-half of the gauge glass. By this arrangement the meniscus at the top of the water in the gauge glass is magnified to substantially the whole width of the reflector and there is no confusion of light rays tending to obscure the visibility of the gauge indication. The reflector is secured in position by semi-circular clamping members 27 and 28 to which the respective ends of the reflector are secured. The clamping means for securing the reflector is the same at the upper and lower ends and, therefore, the construction will be described with reference to the lower end only. The clamping member 28 cooperating with its companion semi-circular clamping member 29, the two clamping members being drawn together by screws 30, to form a clamp about the boss 31 extending from the bifurcated member 15.

In order to catch flying pieces of glass in case the gauge glass explodes and to also furnish protection to the glass from injury by exterior objects, a guard is provided in front of the gauge glass, that is to say, on the opposite side of such glass from the reflector. This guard comprises the substantially circular end-bands or supports 32 and 33 between which extend the wires 34 which are substantially parallel to the axis of the gauge glass and are secured at their ends to the end-bands 32 and 33. The guard also has the two longitudinally extending strips 35 connecting the ends of the end-bands. At intervals throughout the length of the guard are transversely extending wires 36 which are woven in and out between the wires 34 and serve to space the wires 34 and maintain them in proper position. It will be observed that the wires 34 are of small diameter and are spaced apart so that a much greater area of the guard is included in the open spaces between the wires than is covered by the wires themselves. Also, the cross wires 36 are spaced at comparatively long intervals. They are much further apart than are the wires 34 so that each opening in the guard is a substantial rectangle of great length longitudinally of the gauge and of small width transversely thereto. This arrangement provides a maximum strength as against the impact of flying glass (if the gauge glass should explode) and the least obstruction of vision of the gauge glass.

The guard is secured in position upon the gauge by entering inwardly extending projections 37, upon each side of each of the end-bands 32 and 33 within diagonal slots 38 in the turned in ends 39 of a yoke at each end. Each of the yokes 40 slides upon posts 41 fixed to clamping members 27 and 28, respectively and extending through holes in the yoke, the yoke being prevented from moving off the posts by means of nuts 42, screw threaded upon the ends of the posts. Threaded upon each of the posts and interposed between the clamping members 27 and 28 and their respective yokes 40 are spiral springs 43. The springs thus provide a cushioned or resilient mounting for the guard as against the impact of an explosion of the gauge glass, the guard giving somewhat to the front against the springs 43, under such conditions. This renders the apparatus much more safe as the guard is less likely to be ruptured when thus resiliently mounted than if it were rigidly mounted.

The guard having been placed in position, it is secured by screwing the screw 44 inwardly through the strip 35 until it grips, or projects beneath the yoke piece, when the guard is prevented from being lifted to disengage the projections 37 from the slots 38. It will thus be seen that the guard and the reflector are mounted upon a common clamping means about the bosses 38 and are so related as to be on opposite sides of the gauge glass, and that by loosening the common clamping means, the guard and reflector may be turned about the axis of the gauge glass, to adjust to different points of view of the observer, their relative positions being maintained during such adjustment.

To illuminate the gauge a light, which may be an incandescent lamp, 45, may be supported in front of the gauge, that is, on the opposite side of the gauge glass from the reflector. Such lamp may be supported upon an arm 46 vertically adjustably secured in the arm 47 by means of a clamp 48, the arm 47 being secured to the fitting 3 by a clamp 49. The lamp is provided with a hood or shade 50 which is below and at the outer side of the lamp 45 so as to intercept any rays from the lamp directly to the eye of the observer. In order to secure the best view of the gauge indication, no direct rays from the lamp should be reflected from the reflector 25 directly to the eye of the observer. Only diffused light should be so reflected. It is therefore desirable that the light source 45 should be substantially on a level with the lower end of the reflector but it may vary therefrom. It may be higher under some circumstances. It should not, however, except under extraordinary conditions be at a higher level than the point of the reflector mid-way between its upper and lower ends.

Referring to the general arrangement of Fig. 7, the vertical water column 1 is shown as connected in the usual manner with the steam drum 51 of a steam boiler and the observer 52 is shown in his usual position directly beneath the gauge where he will be in a convenient position to reach the valves 53 and 54 of the blow down pipes 7 and 8 and the chains 55 and 56 operating the valve arms 9 and 12.

The gauge is shown inclined to the vertical as giving more ready and more convenient viewpoints. It will be apparent, however, that the invention is applicable to gauges wherein the gauge glass is vertical.

While the invention has been illustrated in what is considered its best application, it may have other embodiments without departing from its spirit, and is not, therefore, limited to the structures shown in the drawings.

What I claim is:

1. In a liquid level gauge, the combination with a gauge glass, of fittings therefor at each end, a reflector extending along the glass, a guard for said glass extending along the same and a common mounting for said reflector and guard clamped to said fitting, said guard having a spring cushion between it and said mounting.

2. In a liquid level gauge, the combination with a gauge glass, of fittings therefor at each end, a reflector extending along the glass, a guard for said glass extending along the same and a common mounting for said reflector and guard clamped to said fitting, said mounting being turnable to adjust said guard and reflector about said glass, and a spring cushion between said guard and said mounting.

CLARENCE H. LANK.